April 29, 1952  R. O. BLENCH  2,594,385
HEATING OF COFFEE BEANS
Filed Oct. 23, 1946  2 SHEETS—SHEET 1

Inventor
Ronald Oliver Blench
per Ferdinand Broster Bosshardt
Attorney.

April 29, 1952 R. O. BLENCH 2,594,385
HEATING OF COFFEE BEANS
Filed Oct. 23, 1946 2 SHEETS—SHEET 2

Inventor
Ronald Oliver Blench
per Ferdinand Broster Bosshardt
Attorney.

Patented Apr. 29, 1952

2,594,385

UNITED STATES PATENT OFFICE 2,594,385

HEATING OF COFFEE BEANS

Ronald Oliver Blench, Hillside, Southport, England, assignor to E. Griffiths Hughes Limited, Salford, Lancashire, England Application October 23, 1946, Serial No. 705,225
In Great Britain June 29, 1946

6 Claims. (Cl. 99—68)

There are various known processes for the production of those flavour and aroma substances in coffee beans which give to coffee infusions and concentrates the pleasing flavour and aroma liked by all coffee drinkers. One process consists in roasting coffee beans in the presence of air or roaster gases. Another process consisted in immersing coffee beans in heated or boiling oils, especially cotton-seed oil, the coffee beans being for example placed in an open-mesh receptacle and the receptacle immersed in an open oil-bath heated to near boiling point until the coffee beans are browned, the coffee beans thereupon being withdrawn from the oil-bath and allowed to dry. Still another process consists in immersing the coffee beans, whilst confined in a perforate cylinder, in an open bath of oil or melted grease or fat heated to a temperature between 300° and 450° F. until they are cooked, then removing the bath of oil or melted grease or fat, draining the coffee beans and wiping them with a suitable absorbent material.

Roasting of coffee beans in the presence of air or roaster gases has the disadvantages that heating is unequal, volatile flavour and aroma substances are free to escape from the coffee beans, and the oxygen of the air and the roaster gases can enter into and disturb the natural changes which give the desired flavour and aroma substances. Heating of the coffee beans in a bath of oil or melted grease or fat, although producing more equal heating and deterring the escape of flavour and aroma substances, has however the disadvantage that the oxygen of the oil, fat or grease can enter into and disturb the natural changes which are necessary to produce the flavour and aroma substances. Heating of the coffee beans in oil, grease or fat therefore can result in an undesirable modification or destruction of some of the said substances with consequent loss of or departure from the natural flavour and aroma. The presence of oxygen in the bath enables the beans to react detrimentally with the bath.

Furthermore experiments have proved that flavour and aroma substances obtained by heating the coffee beans have marked reducing properties and that after repeated heating and exposure to air, the oil, fat or grease develops oxidation products which are not inert to the highly reactive and markedly reducing flavour and aroma substances produced in the coffee beans. Therefore if use of the oil, fat or grease bath is continued after development of the said oxidation products, there will take place between the said products and the produced flavour and aroma substances, a reaction which is so destructive to the said substances as to reduce the natural aroma and flavour developed by heat, the reduction increasing with each subsequent use of the bath.

The product of the process employing oil, grease or fat is therefore liable to lack in quality and uniformity. It also deteriorates progressively in quality unless the oil, fat or grease is replaced by fresh oil fat or grease as soon as a material quantity of oxidation products has developed. The replacement of oil, fat or grease at the necessary times makes the process costly.

Oils, fats and grease are liable to rancidity. Therefore if the smallest trace of oil, fat or grease is allowed to remain on the coffee beans it may become rancid after storage of the coffee beans for a protracted period and thereby make them unfit for their intended purpose. Because at least a trace of oil, fat or grease must be absorbed by the coffee beans, the danger of the coffee beans becoming unuseable cannot be conveniently and economically avoided.

One object of the invention is to provide a process for producing flavour and aroma substances, which by virtue of the novel medium employed for the immersing bath, eliminates all possibility of oxygen, whether free or combined, from entering into reaction with the beans, and from entering into and disturbing the natural changes which it is sought by heating to produce the desired flavour and aroma substances, which can be employed repeatedly a substantially greater number of times than oil, grease or fat before the development of oxidation products therein renders its further use undesirable, and which is incapable of becoming rancid.

A further object of the invention is to provide plant particularly adapted for using the same medium.

The novel medium employed in said heat process is high-grade paraffin wax which is relatively inert chemically and in regard to flavour and taste, non-toxic, chemically pure and free from odours and taste. The said high-grade, chemically inert and chemically pure paraffin wax has no oxygen in its chemical composition and therefore cannot enter into and disturb the natural changes in the coffee beans or react with the beans. Furthermore the developed flavour and aroma substances of the coffee beans, although having marked reducing properties, cannot react with the said paraffin wax when they are developed, due to the said absence of oxygen from the paraffin wax. In addition, due to the chemical inertness of the said paraffin wax, oxidation products develop so slowly therein that the number of times which the paraffin wax can be used in the production of the flavour and aroma substances before its oxidation products commence to react markedly with the said substances is considerably greater than that which oil, fat or grease can be used. The said paraffin wax is also more available than suitable oils, fats and greases and due to its chemical inertness, residual paraffin wax does not become rancid. In comparison with oils and grease it also has the advantage that it becomes solid and dry on cooling and therefore a residue or trace of paraffin wax carried by the coffee beans after the heat treatment and removal of surplus paraffin wax therefrom does not make the beans unpleasant and messy to handle.

The accompanying drawings illustrate diagrammatically plant which may be employed in the performance of my new process.

In the drawings—

Figure 1:
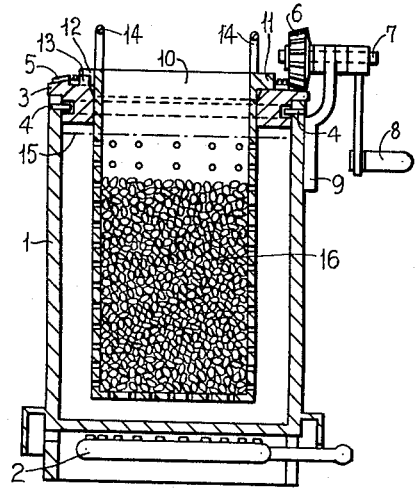
Figure 1 is a side view in section of one form of an apparatus for treating coffee beans with heat.

In carrying out my invention I prepare a bath of molten high-grade paraffin wax which is relatively inert chemically and in regard to flavour and taste, non-toxic, chemically pure and free from odours and taste. Preferably the wax has a melting point of about 60° C.

The wax is heated to a temperature of not less than 180° C. and raw coffee beans are then introduced into the bath in a perforate cage or container.

By increasing the temperature of the wax, the temperature of the coffee beans is then brought fairly slowly up to the critical temperature range of 210° C. to 245° C., and maintained at the desired point for a pre-determined time. The actual maximum temperature and the time are determined by the type and nature of the coffee beans being treated, and the degree of treatment desired. For example if the coffee beans are Santos beans and the treatment is to produce the equivalent of a medium roast as obtained by hitherto known methods, the critical temperature is 222° C. and the predetermined time is five minutes. The wax is stirred whilst the coffee beans are in it and the beans are thereby kept in motion. I find that the heat treatment proceeds relatively rapidly but evenly throughout the mass of the beans.

When the heat treatment is completed, the beans in their cage or container are withdrawn from the bath and suspended above it for a short time for the not paraffin wax to drain back into the bath. After draining, the coffee beans pass to the driers, while a further batch of beans is brought up for roasting. In this way the bath of paraffin wax is kept constantly at work. The bath can be used repeatedly until chemical control tests indicate the presence of oxidation products of the paraffin wax in appreciable amounts. The bath cannot be used with advantage after development of an appreciable amount of oxidation products therein because the flavour and aroma substances resulting from the heating of the coffee beans have marked reducing properties and oxidation products are not inert to those substances but react destructively to diminish them materially. Due to the chemical inertness of the paraffin wax, oxidation products cannot form so quickly as they do with oil, grease and fat, and therefore the same bath of paraffin wax can be used considerably more times than a bath of oil, grease or fat before being made unfit by oxidation. From time to time small quantities of fresh wax can be added to replace the slight loss due to the residue adhering to the coffee beans after heat treatment and draining.

By the preparation of the coffee beans with the aid of paraffin wax as described in the example, a completely homogeneous heat treatment is obtained, since in the hot paraffin wax no local temperature variations can occur, and an even degree of heating of the coffee beans is therefore ensured and because the coffee beans are immersed in wax throughout the operation, the loss of the desirable aromatic constituents of the coffee including the elements of what is commonly referred to as caffeol, is reduced as compared with the loss normally incurred when coffee is roasted in the presence of air or roaster gases.

During the early stages of the preparation of the coffee beans as described in the example, the natural moisture in the coffee beans vaporizes and gives rise to regular, controlled "bubbling." At this stage, however, the principal valuable volatile constituents have not yet been formed. Only at a later stage, namely when nearly all the moisture has been lost by evaporation are the most desirable flavour and aroma substances which contribute so greatly to the rich flavour and taste and aroma of good coffee, developed and liberated. My manner of preparation of the coffee beans reduces the liability of these essential constituents substances to escape from the coffee beans. As the natural changes resulting in these substances can be entered into and disturbed by the presence of oxygen, and oils, greases and fats natural contain oxygen, the known baths of oils, greases and fats, although avoiding access of atmosphere and roaster gas oxygen, apply a self-contained source of oxygen to the coffee beans whilst they are being heat treated in the bath and thereby present a serious possibility of spoiling of the production of the said substances. Furthermore the oxygen naturally contained in oils, greases and fats can react detrimentally with the coffee beans and thereby be the cause of undesirable impurities. High-grade paraffin wax which is relatively inert chemically is completely devoid of oxygen and the use of a bath thereof for heating coffee beans, in order to make them suitable for the preparation of coffee infusions therefrom for use as a beverage or concentrate, avoids contact of atmosphere and roaster gas oxygen with the coffee beans whilst performing the novel function of avoiding contact of any other oxygen whatsoever, whether free or bound, with the coffee beans during the whole period of the said heating.

In my process of preparation of coffee beans as described in the example, there are no air or roaster gases and no oil, fat or grease containing oxygen to cause at elevated temperature chemical reactions leading to the development of undesirable products in the coffee beans, such as oxidation products and other "breakdown" products which detrimentally affect the flavour, aroma and taste.

In a series of comparative tests, the "cup value" of coffee beans prepared as in the hereinbefore described example was superior to those roasted as hitherto, and comparative tasting tests of coffee infusions showed that beans stored after preparation as in the described example did not deteriorate as much and as rapidly as similar beans stored for a similar period under similar conditions after roasting in known manner. The residual paraffin wax from the paraffin bath in which the beans were heat treated did not develop rancidity, as do the residues of oil, grease and fat baths when the beans heat treated therein are stored.

If the coffee is intended for use with a percolator in which the rate of drip is sufficiently slow, the presence of a proportion of paraffin wax, say even up to 10% by weight, does not present any special difficulty since during the preparation of infusions from the ground coffee, the wax remains on the top surface of the grounds and does not percolate through with the aqueous extract into the receptacle below. If the coffee beans are intended for infusion by other methods, they can be treated after the heat treatment to leave on them a smaller proportion or residue of wax.

Figure 1 of the accompanying drawings illustrates a plant which can be used to assist in the performance of my process, and shows a vat 1 which can be heated, for example by a gas burner 2. The vat 1 supports a ring 3 which is rotatable thereon and is retained against being lifted off by pins 4 engaging an annular slot in the ring 2. An annular row of bevel teeth 5 is provided on the ring 3 and meshes with a bevel wheel 6 mounted on a shaft 7 which is rotatable by means of a crank handle 8. The shaft 7 is journalled in a bearing bracket 9 secured to the vat 1. A sheet metal basket 10 provided with perforations as shown depends loosely through the ring 3 and has a peripheral flange 11 which by resting on the ring 3 suspends the basket 10 loosely thereon. A lug 12 provided on the ring 3 loosely engages a slot 13 in the flange 11 to establish a positive driving connection between the ring 3 and the basket 10. Carrying handles 14 are provided on the basket 10. The vat 1 contains the paraffin wax which is melted and given the required temperature by the burner 2. Before insertion in the molten paraffin wax, the basket 10 is filled with coffee beans 16 up to the indicated level. The basket 10 is then placed in position, and the level of the paraffin wax thereby raised to that indicated by the dot-and-dash line 15. The handle 8 is then turned to rotate the shaft 7, bevel wheel 6 and ring 3 and therefore the basket 10, whereby the paraffin wax is stirred. When the heat treatment has been performed, the basket 10 is raised clear of the medium paraffin wax and allowed to drain. The basket 10 is then completely removed and can be replaced by a similar duplicate basket already charged with untreated coffee beans so that the heat treatment of another batch can be taking place whilst the removed basket is being emptied of the treated coffee beans and filled with a new charge of untreated coffee beans.

Figure 2:
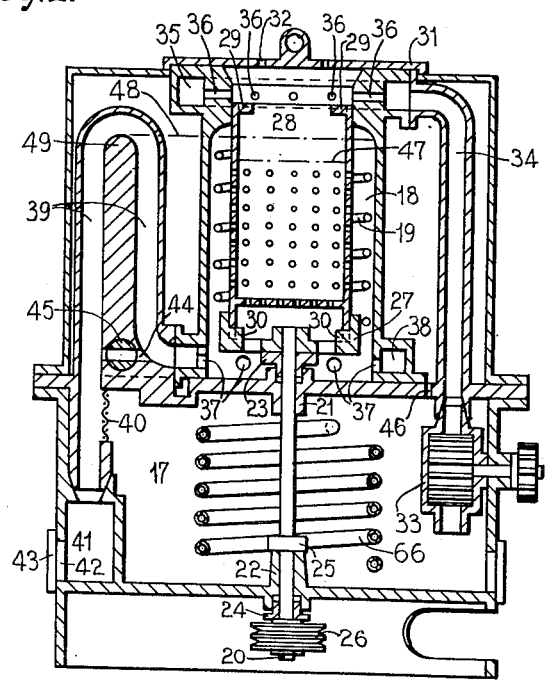
Figure 2 is a side view in section of another form of apparatus for treating coffee beans with heat.

In the construction of plant shown in Figure 2, a reservoir tank 17 having an internal steam heating coil 66 or an electric heating element has a vat 18 provided above it. The vat 18 has an internal steam heating coil 19 or electric heating element. A spindle 20 extends from beneath the tank 17 through bearings 21 and 22 and packing glands 23 and 24 into the vat 18. The shaft is supported axially by a collar 25 removably fixed to it and is rotatable by means of a pulley 26. A perforated, peripherally flanged table 27 is fixed to the upper end of the shaft 20 to rotate therewith. A perforated basket 28, which can be inserted into and removed from the vat 18 through its open top by the aid of two inwardly projecting, diametrically arranged lugs 29, is supported axially by the table 27. A driving connection is established between the table 27 and the basket 28 by diametrically arranged lugs 30 provided on the table 27 and adapted to engage slots in the bottom rim of the basket. A lid 31 having vent holes 32 rests on the vat 18 to close it. A pump 33 is provided in the tank 17 and connected by a conduit 34 to an annular passage 35 provided on the upper part of the vat 18 and communicating with the interior of the vat by means of passages 36. The vat 18 is provided at its lower part with passages 37 leading into an annular passage 38 connected to an inverted U-shaped conduit 39 which extends into the tank 17 and communicates therewith through a filter 40. The lower end of the conduit 39 opens into a sump 41 having an outlet 42 which can be emptied by removal of a cover 43. A by-pass passage 44 controlled by a cock 45 is provided to connect the lower parts of the conduit 39. A vent hole 46 is provided in the top of the tank 17. To use the plant a supply of paraffin wax is melted and heated to the requisite temperature in the tank 17 by the steam coil 66 or electric element, the vat 18 being empty. The basket 28, charged with coffee beans up to the level indicated by the dot-and-dash line 47 is lowered into the tank 18 until it rests on and engages the table 27. The cock 45 is closed and the lid 31 is placed in position and the steam coil 19 or electric element in the vat 18 is set in operation. The pump 33 is then set in operation and pumps the paraffin wax through the conduit 34 and passages 35 and 36 into the basket 28 from whence it passes through interstices between the coffee beans and through the perforations of the basket 28 and accumulates in the conduit 39, vat 18 and basket 28 until its level has reached that indicated by the dot-and-dash line 48, whereupon it flows over the sill 49, down the conduit 39 and through the sieve 40 back into the tank 17. Pieces of solid matter are stopped by the sieve 40 and settle in the sump 41. The sill 49 causes the level of the paraffin wax of the sump to rise and remain above the coffee beans when they have settled in the basket 28. The continued action of the pump ensures a continuous circulation of the paraffin wax through the basket during the period of the heat treatment, during which the basket 28 is rotated slowly by rotation of the spindle 20 and therefore the table 27. This rotation assists in the uniform distribution of the paraffin wax flowing into the basket 28 and stirs the paraffin wax in the vat 18. When the treatment is complete, the pump 33 is stopped and the cock 45 opened, whereupon the paraffin wax in the vat 18 runs back into the tank 17 through the passage 44. The vent 46 permits the escape of air as the level in the tank 17 rises.

When sufficient paraffin wax has escaped sufficiently to leave the basket 28 uncovered, the speed of rotation of the spindle 20 and therefore the basket 28 is increased sufficiently to cause paraffin wax still retained by the basket and coffee beans to be thrown out by centrifugal action. The lid 31 is then lifted off and the basket 28 removed to enable it to be emptied.

Figure 3:
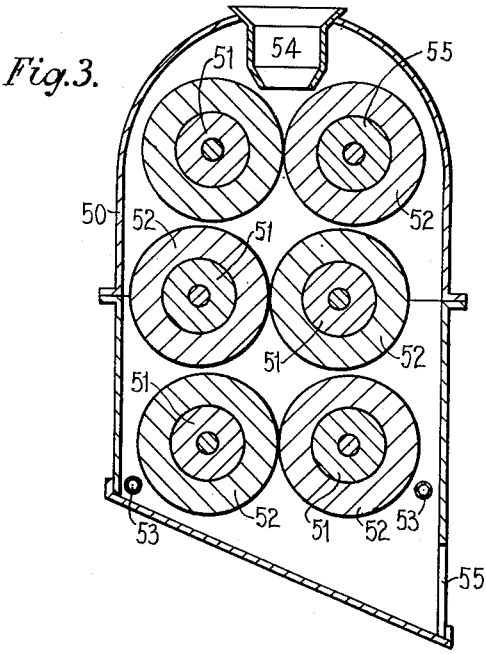
Figure 3 is a side view in section of one form of apparatus for removing medium which has remained adherent to the coffee beans after they have been withdrawn from the bath of medium or the bath of medium has been withdrawn from them.

Figure 3 shows a machine for removing residual paraffin wax from the coffee beans after they have been heat treated and drained. The machine comprises a casing 50 in which there are pairs of rotatable rollers 51 having a thick jacket 52 of absorbent material, such as felt, cotton wadding and so forth. Steam pipes 53 may be provided to retain the temperature in the casing 50 somewhat above the melting point of the medium. A hopper 54 is provided through which the treated coffee beans are introduced into the casing 50 where they come into contact with the jackets 52 and have residual paraffin wax wiped or soaked off them by the jackets. The beans thereupon escape from the casing 50 through an outlet 55.

Figure 4:
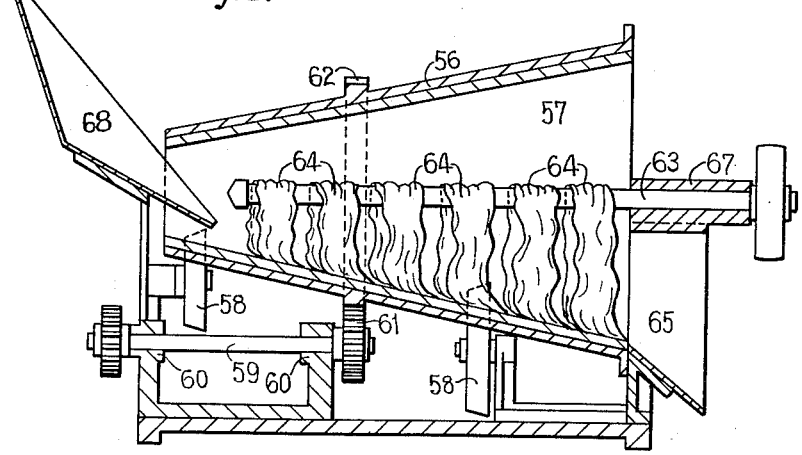
Figure 4 is a side view in section of another form of apparatus for removing medium which has remained adherent to the coffee beans after they have been withdrawn from the bath of medium or the bath of medium has been withdrawn from them.

Figure 4 shows another machine for removing residual medium and comprising a conical drum 56 having a renewable absorbent lining 57 and supported on rollers 58. The drum 56 is rotatable by means of a shaft 59 mounted in bearings 60 and having a spur wheel 61 in mesh with a peripheral row of spur teeth 62 provided on the drum 56. A rotatable shaft 63 is journalled in a bearing 67 mounted on a stationary discharge chute 65 provided at the larger end of the drum 56. The shaft 63 carries renewable pieces 64 of absorbent fabric which are whirled round by rotation of the shaft 63 at a high speed. A stationary hopper 68 extends into the smaller end of the drum 56. The coffee beans, after heat treatment and draining are poured into the hopper 68 from whence they fall into the rotating drum along which they gravitate to the larger end of the drum 56 and then move on to and fall from the chute 65. During their passage through the drum, they are in contact with the lining 57 which takes residual paraffin wax from them, and are agitated and wiped by the pieces 64 which also take residual paraffin wax from them.

It is to be understood that my process is not limited to the use of any of the hereinbefore described plant or machines, as any suitable plant or machinery may be employed in carrying out the said process or removing residual medium after the heat treatment.

I claim:

1. A process of heat treating coffee beans, consisting in immersing unroasted coffee beans in a bath of molten, heated high-grade paraffin wax which is inert chemically and in regard to flavour and taste, non-toxic, chemically pure and free from odour and taste, keeping the coffee beans in the said paraffin wax until they have become roasted by heat received from the heated paraffin wax, removing the thus roasted coffee beans from the bath of paraffin wax whilst it is still molten and removing surplus paraffin wax from the coffee beans after they have been removed from the bath.

2. A process of treating coffee beans, consisting in immersing them in preheated high-grade paraffin wax which is inert chemically and in regard to flavour and taste, non-toxic, chemically pure and free from odours and taste, then increasing the temperature of the paraffin wax to a predetermined maximum, maintaining the paraffin wax at the said temperature for a predetermined period and thereupon separating the coffee beans and the medium, the medium being kept in motion during the treatment.

3. A process of preparation of coffee beans by heat for enabling coffee infusions and concentrates to be made therefrom, consisting in heating a bath of molten high-grade paraffin wax which is inert chemically and in regard to flavour and taste, non-toxic, chemically pure and free from odours and taste to at least 180° C., placing the raw coffee beans in the bath, increasing the temperature of the wax slowly up to a temperature of from 210 to 245° C., maintaining the bath at that temperature until the desired amount of chemical change has taken place in the coffee beans, and thereupon separating the coffee beans and the paraffin wax, the paraffin wax being stirred whilst the coffee beans are in it.

4. A process of heat treating coffee beans, consisting in heating the coffee beans for roasting them, and whilst the coffee beans are being thus heated, keeping them immersed in pure heated paraffin wax for excluding the possibility of contact of chemically free oxygen and chemically bound oxygen with the coffee beans.

5. A heat treated coffee bean enveloped in a film of high-grade paraffin wax which is inert chemically and in regard to flavour and taste, non-toxic, chemically pure, free from odour and taste and excludes free oxygen, chemically bound oxygen and physically bound oxygen from contact with the coffee bean.

6. A process of heat treating coffee beans consisting in heating raw coffee beans in molten pure paraffin wax until they acquire a condition in which a coffee beverage can be prepared therefrom by infusion.

RONALD OLIVER BLENCH.

REFERENCES CITED

The following references are of record in the file of this patent:

UNITED STATES PATENTS

| Number | Name | Date |
|---|---|---|
| 45,762 | Staunton | Jan. 3, 1865 |
| 245,996 | Clotworthy | Aug. 23, 1881 |
| 430,182 | Gassen et al. | June 17, 1890 |
| 984,334 | Wilkins | Feb. 14, 1911 |
| 1,179,046 | Sherer | Apr. 11, 1916 |
| 2,054,689 | Andresen | Sept. 15, 1936 |
| 2,278,767 | Brophy | Apr. 7, 1942 |
| 2,288,284 | Kellogg | June 30, 1942 |

FOREIGN PATENTS

| Number | Country | Date |
|---|---|---|
| 2,744 | Great Britain | Aug. 4, 1875 |